United States Patent [19]
Hintenlang et al.

[11] Patent Number: 5,695,535
[45] Date of Patent: Dec. 9, 1997

[54] POCKET FILTER

[75] Inventors: Dieter Hintenlang, Absteinach; Dieter Unrath, Weinheim; Udo Michaelis, Weiterstadt; Margit Hofmann, Gorxheimertal, all of Germany

[73] Assignee: Carl Freudenberg, Weinheim, Germany

[21] Appl. No.: 825,066

[22] Filed: Mar. 27, 1997

Related U.S. Application Data

[63] Continuation of Ser. No. 519,799, Aug. 28, 1995, abandoned.

[30] Foreign Application Priority Data

Dec. 5, 1994 [DE] Germany ............... 44 43 144.9

[51] Int. Cl.$^6$ ................................. B01D 46/02
[52] U.S. Cl. ................ 55/379; 55/483; 55/484; 55/491; 55/508; 55/DIG. 12
[58] Field of Search ............... 55/341.1, 341.6, 55/378, 379, 483, 484, 491, 497, 501, 508, DIG. 12

[56] References Cited

U.S. PATENT DOCUMENTS

| | | | |
|---|---|---|---|
| 3,190,059 | 6/1965 | Bauder et al. | |
| 3,616,625 | 11/1971 | Cotabish et al. | 55/491 |
| 3,834,134 | 9/1974 | McAllister | 55/DIG. 12 |
| 3,844,749 | 10/1974 | Carter, Sr. | 55/378 |
| 4,080,185 | 3/1978 | Richter et al. | 55/379 |
| 4,197,100 | 4/1980 | Hausheer | 55/491 |
| 4,356,011 | 10/1982 | Day et al. | 55/DIG. 12 |
| 5,298,044 | 3/1994 | Sutton et al. | 55/DIG. 12 |
| 5,320,655 | 6/1994 | Ernst | 53/378 |

FOREIGN PATENT DOCUMENTS 942204  2/1974  Canada ............... 55/DIG. 12

*Primary Examiner*—C. Scott Bushey
*Attorney, Agent, or Firm*—Furgang & Milde, LLP

[57] ABSTRACT

A pocket filter includes a front frame which accommodates at least two filter bags. The top of each bag accommodates a reinforcing frame. The bags are secured dust-tight to one another, to the reinforcing frames, and to the front frame. The front frame is a severed at at least one point along its perimeter. The front frame has a U-shaped channel around it that opens inward, and the reinforcing frames can be inserted into the channel when the front frame is open at the severed point. The reinforcing frames match each other and match the size of the front frame, creating a dust-tight contact between all the adjacent reinforcing frames and the inner surface of the channel when the front frame is closed at the severed point. Facing webs, disposed in the channel opening on each side of the "U", create a dust-tight contact with the reinforcing frame.

12 Claims, 2 Drawing Sheets

POCKET FILTER

This application is a continuation of application Ser. No. 519,799, filed Aug. 28, 1995 now abandoned.

BACKGROUND OF THE INVENTION

The present invention concerns a "pocket filter" including a front (upstream) frame that accommodates and surrounds at least two filter bags or "pockets". The mouth of each bag accommodates and incorporates a reinforcing frame. The bags are secured dust-tight to one another, to the respective reinforcing frame, and to the front frame.

A pocket filter of this general type is known from U.S. Pat. No. 3,190,059. The front frame and reinforcing frames are made of metal and are riveted together and to the bags. Such a pocket filter is complicated to produce and difficult to dispose of.

SUMMARY OF THE INVENTION

The principal object of the present invention is to provide an improved pocket filter of the aforesaid type which is easier to manufacture and to dispose of.

This object, as well as further objects which will become apparent from the discussion that follows, are achieved, in accordance with the present invention, by producing a pocket filter with a front frame that is severed at at least one point along its perimeter. The front frame also has a U-shaped channel or groove around it that opens inward. The reinforcing frames can be inserted into the channel as long as the front frame is open at the severed point. The reinforcing frames match each other and match the size of the front frame, creating a dust-tight contact between all the adjacent reinforcing frames and the inner surface of the channel when the severed point is closed.

The front frame can, in its simplest form, comprise a length of structural section which is bent at four locations and has its ends joined at the severed point. A frame of this type will be inherently very rigid as manufactured and can be made even more non-displaceable and stable by inserting the reinforcing frames. Even when the sides of the front and reinforcing frames are very thin, neither deformations nor vibrations due to turbulence in the filtered air are likely to occur while the pocket filter is in operation. A pocket filter in accordance with the present invention will accordingly achieve excellent filtration characteristics.

The reinforcing frames can constitute an integrated component of the bags. On the other hand, they can also be produced separately and then secured to the bags in the region of their upper edges. It is of advantage if the material that the bags are made of is arranged on the outer surface of the reinforcing frames. The material can simultaneously function as a seal when the reinforcing frames enclosed in it are forced together at the sides and into the channel in the front frame. In this event, the thickness of the material must be subtracted when dimensioning the reinforcing frames and the front frame, considering the extent that the material must be compressed in order to obtain the desired seal.

It has been demonstrated to be of advantage for the front frame, the reinforcing frames, and/or the filter bags to be entirely made of a completely combustible material: an organic or polymeric material for example. It will accordingly be unnecessary to separate the various components after use, and the overall assembly can be burned along with the dust trapped therein in order to dispose of it.

The inherent rigidity of the pocket filter can be considerably increased if the reinforcing frames are themselves strutted. They can also be provided with fasteners on their facing sides so that they can be fastened non-displaceably together. The overall stiffness can accordingly be even further increased.

Fasteners of this type can comprise projections, for example, that fit into holes in the adjacent reinforcing frames or the front frame. The projections can be provided with possibly resilient notches that, once the projections have been inserted, engage an undercut and further stabilize the connection. This is of advantage especially in relation to permanent sealing of the intermediate zone that accommodates the filter-bag material. Assembly can be accelerated with snap-together connections. The parts can also be tacked together.

It has been demonstrated to be practical, with respect to assembling the pocket filter in accordance with the present invention, for the bags to have "eyes" in the vicinity of their upper edges that can be slipped over the projections. This approach considerably facilitates not only adjusting the bags in relation to the separate reinforcing frames but also ensures a dust-tight seal during operation. It is of advantage for all the reinforcing frames and all the bags to be designed identically. This approach avoids errors in assembly.

The front frame can be welded or cemented together or connected by inserted corner braces or by bending. It is also possible to connect the abutting ends in the vicinity of the severed point and even mask the joint with just a strip of adhesive tape. Tape is not only inexpensive but also completely combustible. It is very easy to apply and remove. If braces are inserted at every corner, the diagonal rigidity will be particularly satisfactory. This is important for simplifying assembly.

The simplest embodiment of the pocket filter in accordance with the present invention comprises only three components, specifically: the front frame, a standard filter bag, and a standard reinforcing frame. These components can be easily manually assembled, as desired, into ready-to-use pocket filters and thereafter disassembled when necessary. It accordingly becomes possible to replace partly used bags with fresh ones if necessary. This not only reduces the consumption of new parts but also reduces the expense of shipping and handling pocket filter parts.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
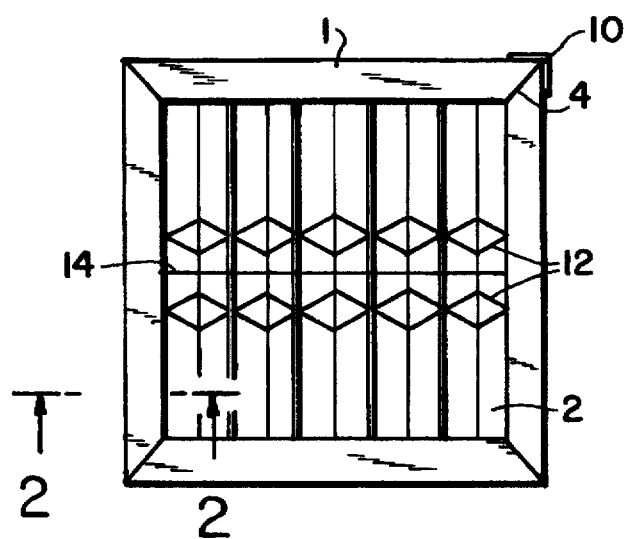
FIG. 1 is a front view of a pocket filter according to the present invention.

The preferred embodiments of the present invention will now be described with reference to FIGS. 1–6 of the drawings. Identical elements in the various figures are designated with the same reference numerals.

Figure 3:
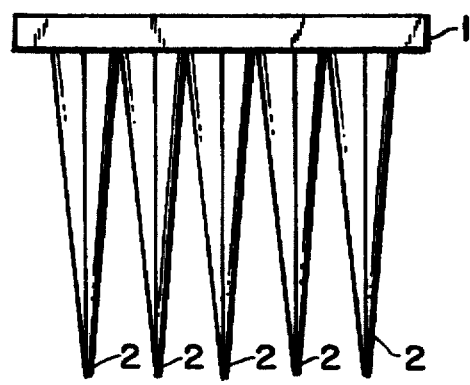
FIG. 3 is a top view of the pocket filter illustrated in FIG. 1.

The pocket filter illustrated in FIGS. 1 and 3 comprises a front frame 1 that encloses the upper edges of five filter bags 2. Each filter bag 2 has a reinforcing frame 3 attached to its upper edge. The filter material that accordingly surrounds the reinforcing frames can have a high inherent elasticity. The material is forced dust-tight between the adjacent reinforcing frames 3 and between the reinforcing frames and the front frame 1 when the frames are joined.

Figure 2:
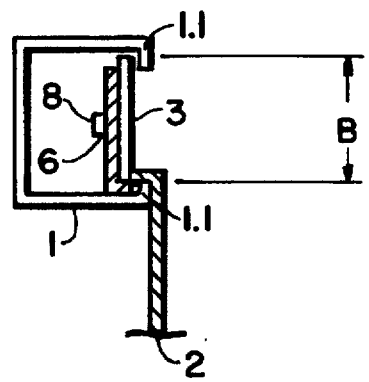
FIG. 2 is a section through the frames of the pocket filter illustrated in FIG. 1, taken along the section line A—A.

The front frame 1 is made of a length of U-shaped polypropylene structural section which opens inward as shown in cross-section in FIG. 2. A reinforcing frame 3 with an associated filter bag 2 is inserted into the front frame 1 at a severed point 4 when the front frame is open at this point, and the ends of the front frame are permanently joined at this point with adhesive tape 10. Five reinforcing frames 3 will accordingly be adjacently secured in the inwardly opening, circumferential channel 5 of the assembled pocket filter. The reinforcing frames themselves will be secured to the upper edges of the individual filter bags 2. The material that the bags are made of will force the reinforcing frames together and against front frame 1, producing an airtight seal. More or less than five bags can be employed, as necessary.

Figure 4:
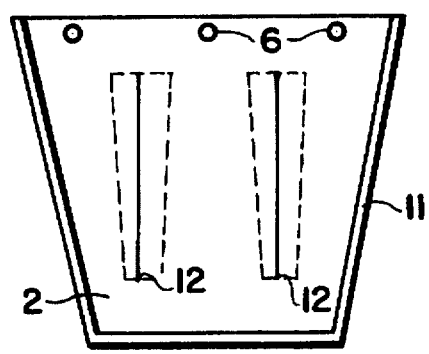
FIG. 4 illustrates a filter bag of the type incorporated in the pocket filter illustrated in FIG. 1.

FIG. 4 illustrates a collapsed filter bag. It comprises two parallel trapezoidal filter mats of thermoplastic permanently fused, sewn, or cemented together at the sides into a continuous margin 11. The margin 11 simultaneously acts as a reinforcement, providing the bags with the capacity to maintain themselves erect when mounted perpendicular in a filter assembly.

Hollow conical spacers 12 are fused or cemented to the inner surfaces of the bags. Spacers 12 inflate into a highly stable shape subject to the force of the air being filtered when the filter is in operation. The spacers extensively suppress the fluttering that can allow the penetration of dust through the filter.

Figure 5:
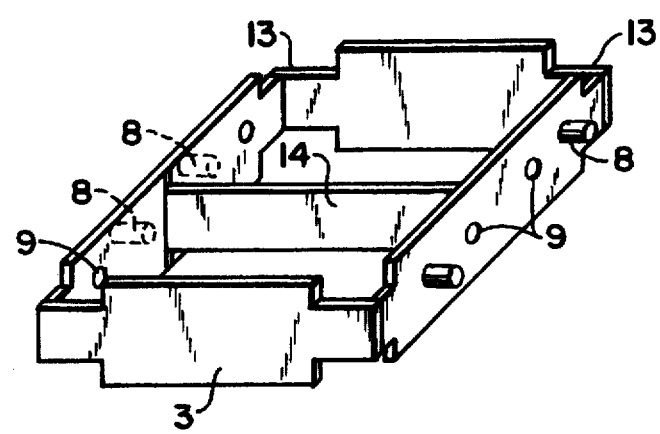
FIG. 5 illustrates a reinforcing frame of the type incorporated in the pocket filter illustrated in FIG. 1.
Figure 6:
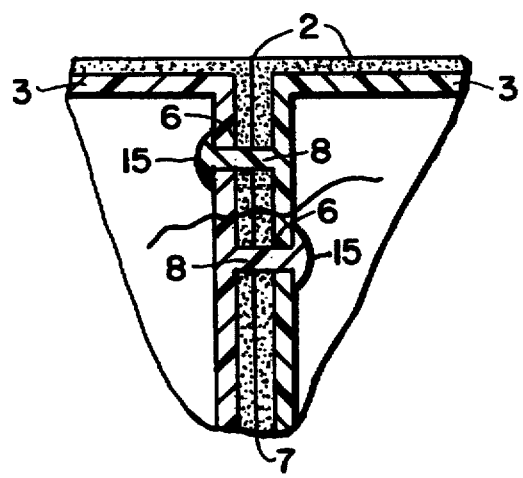
FIG. 6 is a larger-scale detail of part of the front of the pocket filter shown in FIG. 1.

The filter bag 2 has eyes 6 in its upper edge that slip over projections 8 on the reinforcing frames 3, precisely positioning the bag. The facing sides of each reinforcing frame 3 are secured with struts 14. FIG. 5 illustrates for simplicity's sake only one such strut, perpendicular to the sides of a reinforcing frame 3. Oblique struts may also be provided to substantially improve diagonal rigidity.

Once the individual bags as illustrated in FIG. 4 have been mounted in the individual reinforcing frames as illustrated in FIG. 5, the resulting subassemblies are placed side by side as illustrated in FIGS. 1 and 3 with the projections 8 on each reinforcing frame extending into holes 9 in the adjacent frame. The individual filter bags 2 are accordingly positioned precisely in relation to not only each reinforcing frame but also the overall assembly. The assembly is then inserted into the inwardly-opening channels in the front frame 1, which is made of a structural section, having a cross-section in the shape of a "C" bent inward at four locations at a 90° angle. The ends of the section are joined in the vicinity of the severed point 4 and rigidly fastened with adhesive tape 10 on the outer surface. The resulting assembly is then ready to use.

FIG. 2 illustrates the resulting deformation of the filter bag material in the region where tension is applied by the sides of front frame 1. Several layers of the material will be present, compressed perpendicular to its thickness and forced against the frame by the oncoming air while the filter is in operation. The open side of the channel 5 is narrowed by two facing webs 1.1 to less than the width B of the reinforcing frame 3. The reinforcing frame 3 must accordingly be elastically twisted around its axis to allow the insertion and is for this reason provided with a cutout 13 (FIG. 5) in the side and end at every corner. Once the material has been inserted, the reinforcing frame will regain its original shape illustrated in FIG. 5. The frame is accordingly additionally secured in the channel 5 to prevent it from dropping out and to avoid leakage where it is attached to a bag. This additional security can be equated with extra fastening. The resulting attachment is particularly reliable and permanent.

The reinforcing frame 3 can also be made of a polymer: polypropylene for example. In this event it will be possible to melt a thickening 15 on the ends of projections 8 (FIG. 6) once the filter bags 2 have been joined together with the reinforcing frames 3 inside them to permanently fasten the components together. There will accordingly be two facing layers 7 of material forced together between each pair of reinforcing frames 3, ensuring a satisfactory seal. Dust will accordingly be prevented from penetrating through this zone as well.

The pocket filter in accordance with the present invention can be made entirely of completely combustible materials, organic and/or polymeric substances for example. Used filters can accordingly be burned.

There has thus been shown and described a novel pocket filter which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A pocket filter having a front side and a rear side, said filter comprising a front frame on the front side that accommodates at least two filter bags, extending from front side to rear side; wherein a top of each bag includes a reinforcing frame; wherein the bags are secured to one another and to the front frame by means of their respective reinforcing frames; wherein the front frame is severed at at least one point along its perimeter, wherein the front frame has a U-shaped channel around it that opens inward such that outer sides of the reinforcing frames can be inserted into the channel when the front frame is open at its severed point; and wherein the reinforcing frames match each other, creating a dust-tight contact between all the adjacent reinforcing frames when the outer sides of the reinforcing frames are inserted into the channel and the front frame is closed at the severed point; the improvement wherein the opening of the U-shaped channel is narrowed by facing webs, one on each opposite side of the "U", at the innermost point on each side of the "U", whereby the narrowed opening is smaller than the width of the reinforcing frame, and the reinforcing frame is inserted into the U-shaped channel while the front frame is severed, thereby creating a dust-tight contact with the reinforcing frames, and retaining the reinforcing frames against inward movement, when the front frame is closed.

2. The pocket filter defined in claim 1, wherein the front frame is a length of U section bent at an angle at four points and with its ends joined in the vicinity of the severed point.

3. The pocket filter defined in claim 2, wherein the angle is 90°.

4. The pocket filter defined in claim 1, wherein the front frame is held closed at the severed point with a permanent fastener.

5. The pocket filter defined in claim 4, wherein the permanent fastener is adhesive tape.

6. The pocket filter defined in claim 1, wherein at least one of the front frame, the reinforcing frames and the filter bags are made entirely of a completely combustible material.

7. The pocket filter defined in claim 6, wherein all of the front frame, reinforcing frames and the filter bags are made entirely of a completely combustible material.

8. The pocket filter defined in claim 1, wherein at least the reinforcing frames have fasteners on opposite sides and can be rigidly mutually engaged by the fasteners.

9. The pocket filter defined in claim 8, wherein the fasteners comprise projections that fit into holes in the adjacent reinforcing frame.

10. The pocket filter defined in claim 9, wherein the tops of the filter bags have eyes that fit over the projections.

11. The pocket filter defined in claim 1, wherein all of the reinforcing frames are identical in size and shape.

12. The pocket filter defined in claim 1, wherein the spacing between the webs in the channel opening is less than the width of the outer sides of the reinforcing frames.

* * * * *